Nov. 1, 1966  F. A. EVANGELIST  3,282,761
MOLDING METHOD, APPARATUS AND PRODUCT
Filed Aug. 22, 1963  7 Sheets-Sheet 1

INVENTOR.
FELIX A. EVANGELIST
BY John H. Widdowson
ATTORNEY

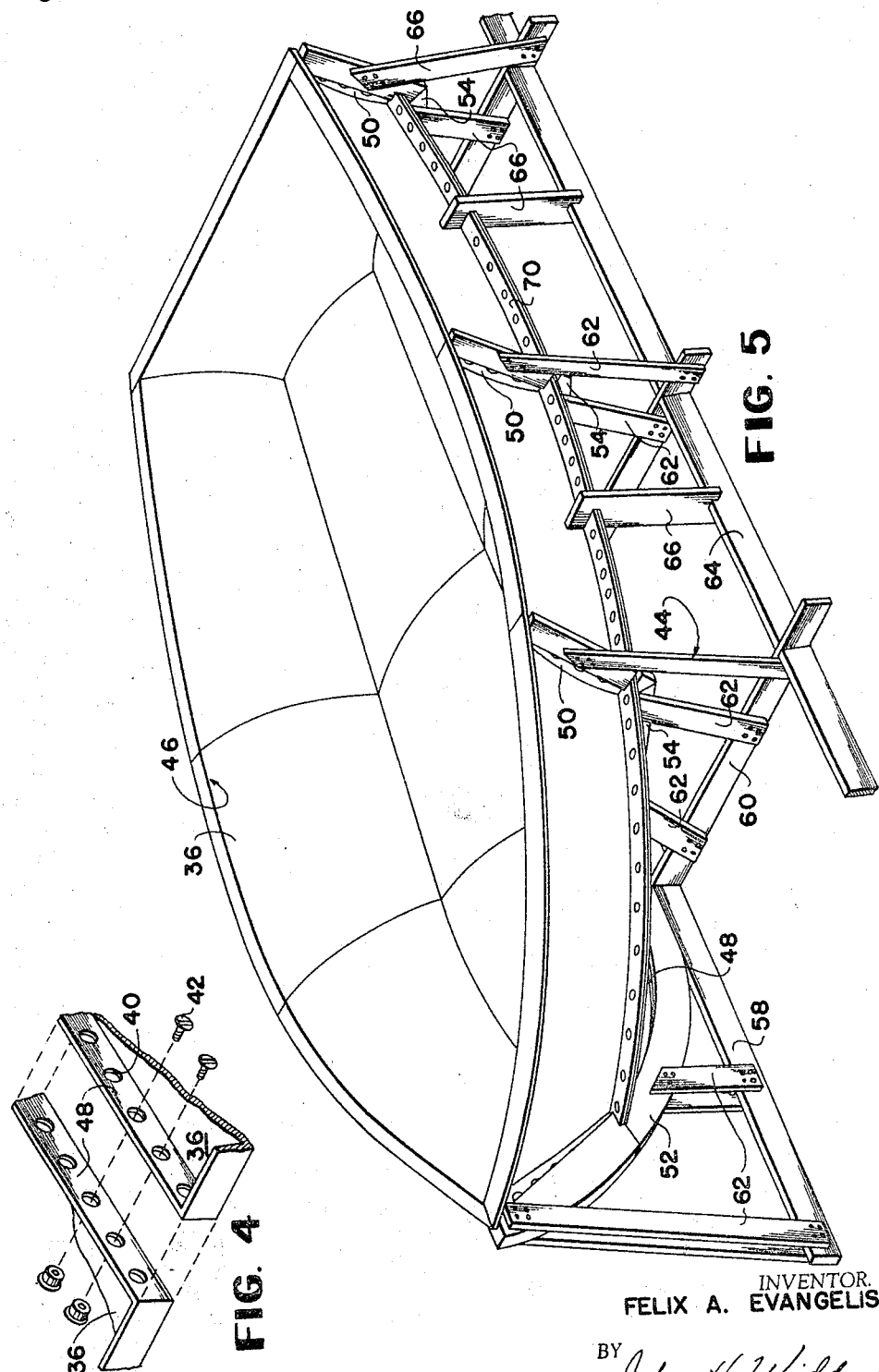

INVENTOR.
FELIX A. EVANGELIST
BY John H. Widdowson
ATTORNEY

INVENTOR.
FELIX A. EVANGELIST
BY John H. Widdowson
ATTORNEY

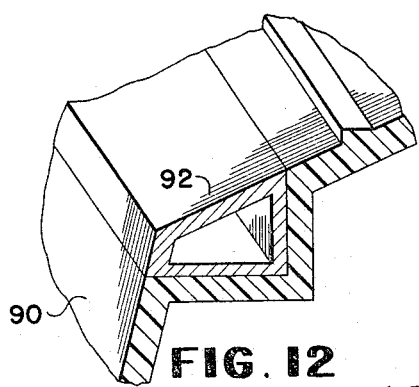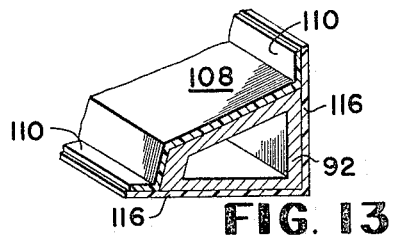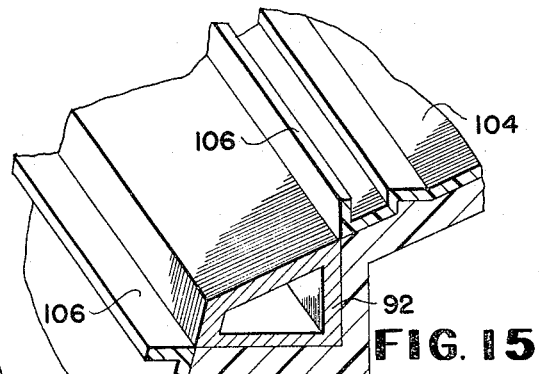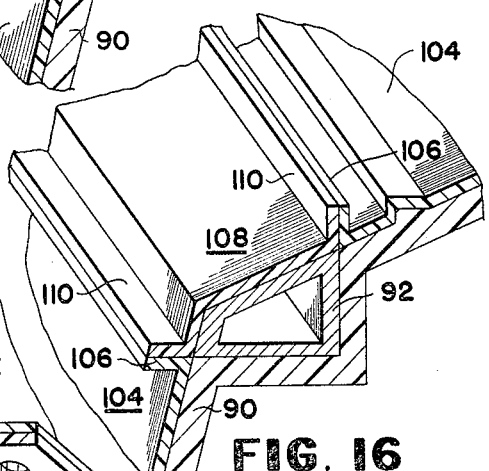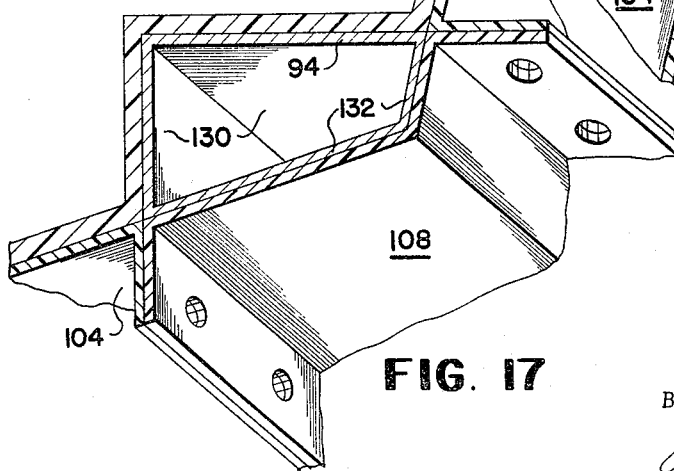

INVENTOR.
FELIX A. EVANGELIST
BY John H. Widdowson
ATTORNEY

Nov. 1, 1966 F. A. EVANGELIST 3,282,761
MOLDING METHOD, APPARATUS AND PRODUCT
Filed Aug. 22, 1963 7 Sheets-Sheet 7

INVENTOR.
FELIX A. EVANGELIST
BY John H. Widdowson
ATTORNEY 3,282,761
MOLDING METHOD, APPARATUS AND PRODUCT
Felix A. Evangelist, 238 Burgess Ave., Alexandria, Va.
Filed Aug. 22, 1963, Ser. No. 303,859
5 Claims. (Cl. 156—249)

This invention relates to molding and/or fabricating. More specifically, this invention relates to a method of fabricating and/or molding, apparatus therefor, and the product produced therefrom. Still more specifically, this invention relates to a method of producing an article having a plastic sandwich construction comprised of outer and inner shells with a layer of material therebetween, which method is particularly suited to the construction of boats and the like. Another embodiment of the invention relates to manufactured articles having a sandwich-type construction, and in particular, to boats and boat hull constructions. Yet another embodiment of the invention relates to novel molding apparatus for producing molded articles, and which is of particular utility in practicing the method of the invention.

The molding of plastic articles by methods known to the prior art, normally involves the use of molds. In the making of larger articles, the mold is normally large, very expensive, requires the knowledge and know-how of a skilled operator to operate it, and, in general, is not suited for the production of only a few articles. The known methods of molding are best adapted to mass production operations involving large investments and the production of a large number of articles on a commercial basis. The convenient known methods of molding are not well suited for use by an amateur or hobbyist to construct and mold only a few, possibly a single, article. Many people who have relatively little, or no skill and experience in the molding art, often desire to build their own boats or other molded articles, particularly a boat having a plastic hull, and most desirably, a boat or other molded article having a sandwich-type construction. Consequently, there is a practical need for a simple molding process and apparatus which will enable them to efficiently attain their desired construction goal.

The conventional molding and/or fabricating apparatus known to the prior art, particularly molding apparatus to mold large objects, as for example, boats, is very cumbersome and expensive and not suited for use by hobbyists, small manufacturers etc. A conventional molding form or mold generally has no particular utility after the article or articles, have been molded. The material used in the mold apparatus or form, which, in many instances is very expensive, can only be discarded and wasted. Also, when mold apparatus known to the prior art is produced by a manufacturer for sale to hobbyists or small commercial manufacturers of relatively a small number of articles, they are quite large and difficult to ship and store. The inconvenience and the expense involved frequently makes such a procedure impractical and/or economically unfeasible.

Molded articles having a plastic sandwich construction known to the prior art are difficult and expensive to form and mold. This type of molded article cannot conveniently be provided with a reinforcing structure as an integral part thereof. In particular, the boats having a plastic sandwich construction known to the prior art are not provided with reinforcing structure and gunwale elements, in which the structure can be of materials other than the material of the hull, and can be sealed within the sandwich-type construction as desired.

I have invented a new method of molding and/or fabricating which involves steps of forming a mold means, molding an element with the mold means, separating the mold means from the resultant molded element, and attaching the mold means to the molded element. Preferably, in forming a mold means, upstanding dividing strips are positioned on the surface of a male master mold and a layer of moldable material is formed over the surface of the master mold and strips. This procedure results in the forming of a composite mold means made up of a plurality of connectible flanged panels. In molding an element with my mold means, a glass fiber mat or any combination of glass fiber cloth, mat or rovings is desirably positioned on the mold means and impregnated with a curable resin. In the preferred embodiment, separating the mold means from the resultant molded article involves stripping the flanged panels of the mold means from the molded element, namely a glass fiber reinforced layer. The mold means, desirably of flanged panel sections, is adhered to the reinforced glass fiber molded element.

The mold means of my invention is a sectioned mold having a surface configuration corresponding to the desired surface configuration of the article to be molded, with the mold being comprised of sections provided with flange portions. A suitable means is provided for securing flange portions of the sections in assembled relation. A support means for the mold is also provided having a base and a support means depending from the base and engaging the flange portions of the sections of the mold to thereby support the mold. The molding means is particularly adapted to be used to form a boat. Preferably, the support means for the mold has a longitudinally extending support member engaging a bottom longitudinally extending mating pair of flanges on the mold. A plurality of longitudinally spaced, transversely extending, support members engaging longitudinally spaced, transversely extending, mating flanges on the mold are also desirably provided. The flanges are preferably disposed within the grooves in the support members.

The molded article of manufacture of my invention, preferably a boat, has an outer shell, a sectioned inner shell, and a layer of material positioned between the outer shell and the sections of the inner shell. Most desirably, the layer of material is a cellular material, most preferably, a foam plastic or honey-comb construction. Preferably, the molded article, or boat, has a reinforcing framework structure consisting of longitudinally extending and transversely extending members positioned between the sections of the inner shell and engaging the inside of the outer shell.

The molding process of my invention solves the problems associated with known molding processes of the prior art. The molding process of my invention can be economically used to produce many similarly shaped molded articles, or only a single article. It can be operated by hobbyists and persons having relatively little or no molding and construction experience. My method is simple, easy, and inexpensive to operate and can be readily modified to produce articles of any desired shape or size. My novel molding apparatus, which can desirably be used in my process, can be inexpensively produced and sold in convenient kit form. The kit form of the apparatus is light, easy to transport, handle, etc.

In regard to the molding apparatus combination of my invention, my apparatus solves the problems associated with molding apparatus known to the prior art, particularly mold apparatus used to construct boats and boat hulls. The molding apparatus of my invention can be very conveniently used to form molded articles having a plastic sandwich construction. My molding apparatus can be used to produce articles, in particular boats, of any size, either very large or small. The apparatus can, as a practical matter, be used to produce articles of immense size since any number of panels or sections can be assembled to form a mold if properly supported. Such large articles can be made by a single inexperienced operator without the necessity of expensive bulky equipment. Further, the apparatus can be used to mold articles having a complex shape including undercut portions and the like. The mold in one embodiment of my invention, after the outer shell of the article has been molded, is utilized to form the inner shell layer of the material. This eliminates much waste and expense. The mold apparatus, including the support, of my invention is light in weight and can be broken down and handled in convenient, small sized units, adaptable to be used and sold in a kit form.

The molded article, preferably a boat hull or boat of my invention, can embody a reinforcing frame which can be integrally fitted within the sections of a sandwich-type construction. The molded article and/or boat is very strong, light in weight, and can be modified to practically any desired shape, size, or form.

It is an object of this invention to provide a new molding and/or fabricating process.

Another object of this invention is to provide a new molding and/or fabricating process for producing a sandwich-type construction.

Yet another object of this invention is to provide a new molding and/or fabricating process adapted to produce articles of widely varying sizes and shapes.

Yet another object of this invention is to provide a new molding process which can be preformed by a hobbyist and/or one having relatively little or no molding and construction experience.

Another object of this invention is to provide a new molding process which is simple and easy to operate.

Another object of this invention is to provide a new molding process which is inexpensive to perform and operate.

An object of this invention is to provide a new molding apparatus combination.

Yet another object of this invention is to provide a molding apparatus which is simple, light in weight, inexpensive, and adapted to accurately reproduce a desired shape in a molded article.

Yet another object of this invention is to provide a molding apparatus adapted to produce a sandwich-type construction, and which can be utilized to produce articles of widely varying sizes and shapes.

Another object of this invention is to provide a molding apparatus having a mold which can be embodied in the molded article after the molding operation is completed.

Another object of this invention is to provide a light, inexpensive, sectional mold which can be conveniently handled, stored and marketed to the general public, and hobbyists in particular.

Another object of this invention is to provide a new construction for molded articles.

Another object of this invention is to provide a boat having a novel sandwich-type construction and a reinforcing frame embodied therein.

Another object of this invention is to provide a novel molded article having a sandwich-type construction which is simple and easy to manufacture.

Other objects and advantages of the invention will be apparent to those skilled in the art from the disclosure set forth herein. Drawings of preferred specific embodiments of the invention accompany and are a part hereof, and such are to be understood to not unduly limit the scope of the invention. In the drawings, FIG. 1 is a perspective view of a preferred specific embodiment of my invention of a male master mold having dividing strips affixed thereto.

FIG. 4 is an enlarged detail view illustrating a portion of two mating flanges.

FIG. 5 is a perspective view of a preferred specific embodiment of my invention illustrating a step in my new molding method and showing a specific embodiment of a molding apparatus combination of my invention for producing a molded article.

FIG. 12 is a detail view of a portion of the master mold of another embodiment of my invention.

FIG. 13 is a detail view showing a chine block having formed thereon a layer of moldable material forming a flanged section of a female mold.

FIG. 14 is a detail view in broken section illustrating a step of a specific embodiment of the method of my invention.

FIG. 15 is a detail view showing a step in my process of forming a flanged section of a female mold.

FIG. 16 is still another detail view illustrating a construction embodiment and a step in my new novel molding process.

FIG. 17 is a detail view showing still another specific embodiment of my mold construction.

Figure 1:
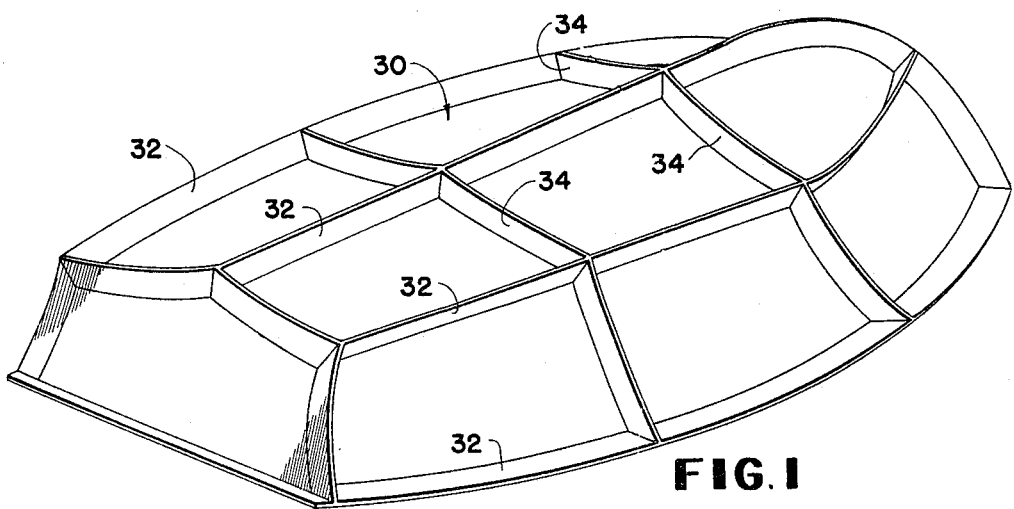

The following is a discussion and description of the new molding method, the molding apparatus, and the molded article of my invention made with reference to the drawings, wherein the same reference numerals are used to indicate the same or similar parts and/or structure. The discussion and description are of preferred specific embodiments of my invention and it is to be understood that such are not to unduly limit the scope of my invention.

Figure 2:
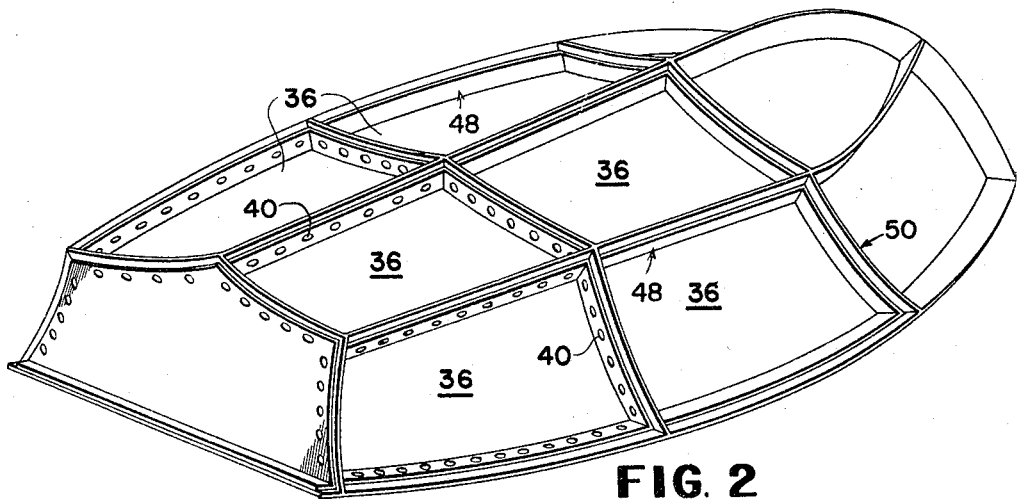
FIG. 2 is a perspective view of a preferred specific embodiment of my invention showing a male master mold and affixed dividing strips having a layer of plastic formed thereover.
Figure 3:
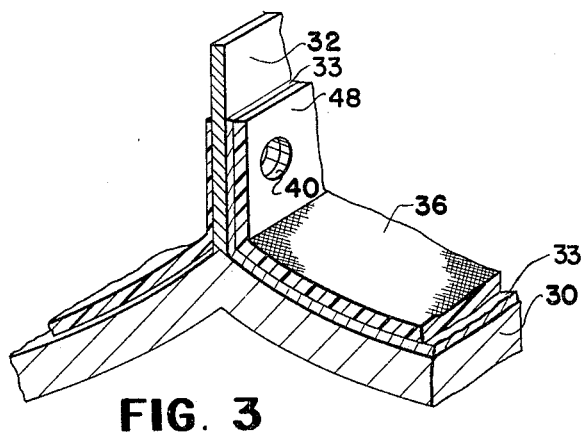
FIG. 3 is an enlarged detail view in perspective showing the relative positions of the male master mold, dividing strips, and layer of molded material.
Figure 6:
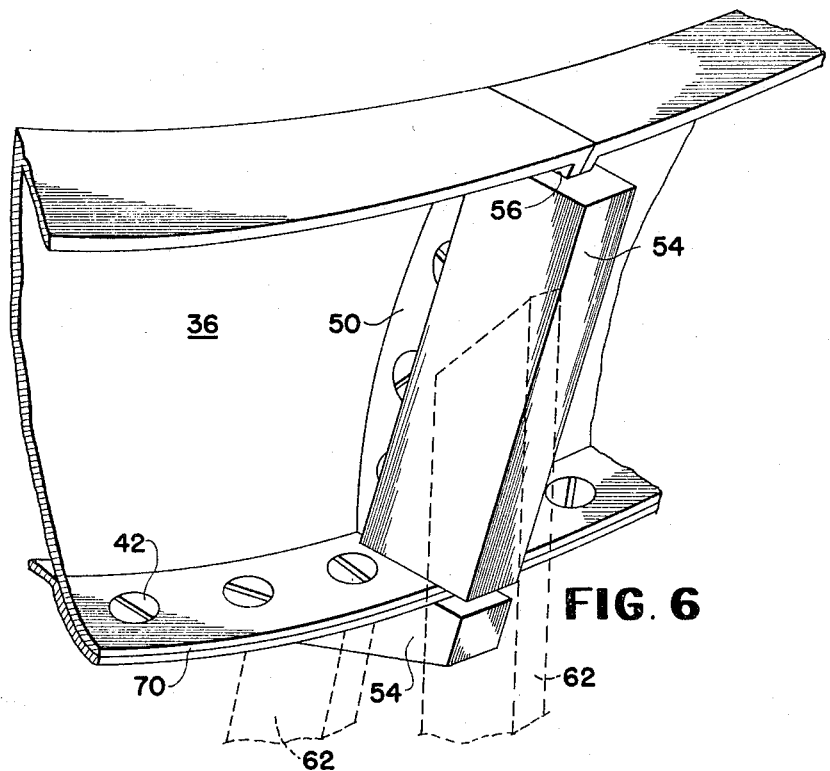
FIG. 6 is an enlarged detail view showing an embodiment of a supporting arrangement of a mating flanged section of the mold of my invention.

Referring now to the drawings, and in particular FIGS. 1 through 8, there is illustrated a specific embodiment of the method of my invention of making a boat having a unitary hull construction of spaced reinforced plastic shell layers with a foamed plastic sandwich layer therebetween. The method of my invention involves selecting or making a suitable male master mold 30, which has an exterior shape and size that corresponds to the desired exterior size and shape of the boat hull to be molded. The male master mold in this embodiment can be another boat, or it can be a full scale model made of plaster, or any other suitable material, formed to the desired shape. Longitudinal and transverse general outwardly extending dividing strips 32 and 34 are affixed to the male master mold 30. Preferably, the dividing strips 32 and 34 are relatively thin and extend outwardly from the master mold a distance of approximately two inches. The dividing strips can be secured to the male master mold 30 in any suitable manner, as for example, by nailing, gluing, doweling, screwing, taping, etc. The dividing strips divide the surface of the male master mold 30 into conveniently sized areas and ultimately determine the size of flanged panels. Preferably, the longitudinally extending dividing strips 32 extend along the keel portion, the chine portions 92, and the top edge portions of the mold. The transversely extending dividing strips 34 are spaced longitudinally. The exact number and positioning of dividing strips is dependent on the type and size of article which is being molded. A mold release lubricant or parting agent 33 is then applied to the surfaces of the master mold 30 and dividing strips 32 and 34. Any suitable type of parting agent can be used, and I have found that a silicone type mold release lubricant works very well. A reinforcing woven mat or cloth of glass fibers or other suitable reinforcing material such as asbestos, is then laid on the master mold surface and the strips 32 and 34 so that it closely conforms to same. The woven mat or cloth can be cut into separate sheets to cover one area outlined by a set of dividing strips, or it can be laid over the entire master mold surface if desired. An impregnating layer of a curable resin is then applied on the master mold and strips over the reinforcing mat to build up a reinforced resin layer. The resin can be applied in any suitable manner, as for example, brushing, spraying, etc. Further, the reinforcing elements in the form of small chopped strands or fragments, etc., and the curable resin can be sprayed on the male mold simultaneously if desired. Further, any suitable molding method such as vacuum bag, pressure bag, matched dies, molding, etc., can be utilized. The result of the glass fiber mat and layer of curable resin is a series of flanged panels or sections 36, as shown in FIG. 2. The section or panel 36 can be of any suitable thickness, but is more preferably a thickness in the range of $\frac{1}{16}$ to $\frac{3}{8}$, and most preferably, from $\frac{1}{8}$ to $\frac{1}{4}$ inch in thickness. If desired, the glass fiber mat or reinforcement can be in other forms than woven mat such as rovings, chopped strands, unwoven mat, yarns, combinations thereof, and the like. Further, other suitable reinforcement can be used in the formation of panel 36, and in some instances may even be omitted. Any suitable curable impregnating resin can be used to form the panels of the female mold. However, I prefer to use polyesters, polyurethanes, epoxies, phenolics, melamines, and the like, or mixtures thereof. As clearly indicated in FIG. 3, the panels 36 preferably having upstanding peripheral flanges 48 and 50 formed thereon. Holes 40 are bored at spaced intervals through the flanges 48 and 50 and dividing strips either before or after, but preferably before removal from the master mold. The resultant individual reinforced flanged plastic sections 36 are then stripped from the master mold 30. If the mat referred to hereinbefore, is laid over the edges of the strips 32 and 34, it will be necessary to cut same at the top of the strips in order to separate the sections 36. The flanged sections 36 are then reassembled and secured together by inserting bolts 42 through the holes 40 to form a female mold 46 as indicated in FIG. 5 of the drawings. The inside of the female mold 46 is adapted to mold an article having the exact identical shape of the master mold depicted in FIG. 1. In reassembling the panels 36, the dividing strips 32 and 34 can, if desired, be removed from the male master mold 30 and embodied in the female mold in the original positions. However, if the dividing strips 32 and 34 are very thin, this procedure is not necessary. The female mold 46 is then positioned on a frame 44 to thereby maintain the mold in an upright molding position.

A specific embodiment of the molding apparatus of my invention for producing a boat hull having spaced inner and outer shells is depicted in FIG. 5. It has a sectioned female mold 46 having an inner surface configuration corresponding to the desired exterior shape of the hull to be molded, and is comprised of a plurality of panel sections 36. The mold 46 has a pair of mating, longitudinally extending, centrally disposed bottom flanges 48, and a plurality of pairs of longitudinally spaced, transversely extending mating flanges 50. The frame 44 for supporting the female hull mold 46 has a grooved, curved, longitudinally extending support member 52 having a profile shape similar to the profile of the female mold 46 that engages the mating pair of centrally disposed bottom flanges 48. A plurality of grooved, longitudinally spaced, transversely extending, support members 54 engage the longitudinally spaced, transversely extending mating flanges 50. The flanges 48 and 50 are disposed within grooves 56 provided in the support members 52 and 54. The frame 44 has a base comprised of longitudinally and transversely extending base members 58 and 60 that underlie the support members 52 and 54, respectively. A plurality of generally vertically extending elements 62 are attached to the longitudinally and transversely extending members 58 and 60 of the base and the overlying support members 52 and 54 for supporting same in proper spaced relation. The female hull mold 46 is thereby supported in an upright position. Additional bracing is provided with longitudinally extending members 64 and vertically upright members 66 which engage a mating flange 70 of female mold 46.

Figure 9:
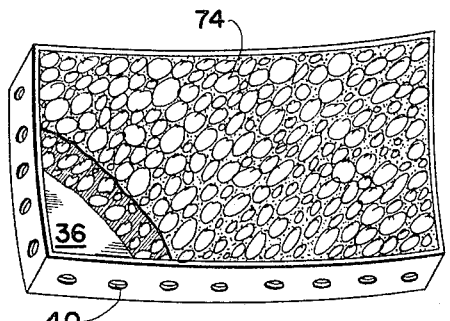
FIG. 9 is a view of a typical flanged section or panel of my mold with a foam plastic layer of material adhered thereto.
Figure 10:
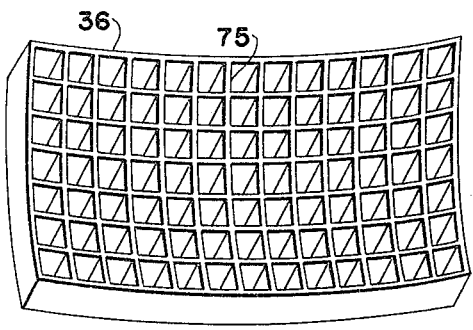
FIG. 10 is another view of a specific embodiment of my invention showing a flanged section or panel of my mold having a honey-combed construction adhered thereto.

After the female mold has been assembled and supported on the frame 44, a silicone mold release lubricant or parting agent is preferably applied to the entire inside surface of the female mold 46. A reinforcing woven mat or glass fibers is then laid on the inside surface of the female mold so that it closely conforms to the surface thereof. An impregnated layer of curable polyester resin, or other suitable resin of the types suggested hereinbefore, is applied to the inside surface of the female mold and the glass fiber mat to build up a resin layer reinforced by glass fiber having a thickness in the range of $\frac{1}{8}$ to $\frac{1}{4}$ inch, or other suitable thickness depending on the size, shape and other requirements of article being molded. After the resin has cured or hardened, the flanged sections 36 are successively disassembled and removed from the resultant outer resin layer. A layer of a curable foamable plastic is applied on the outside surface of each section 36 of the female mold 46 on the side the flanges extend. This layer of foam 74 can be applied in any suitable manner. I prefer to deposit a suitable quantity of curable polyurethane plastic mixed with a suitable foaming or blowing agent preferably a blowing agent which decomposes to form a gas, such as N,N′-dinitrosopentamethylenetetramine, benzene sulfonyl-hydrazide, mixtures thereof, and the like, in the flanged panel and cover with a suitable cover. The mixture can be heated if necessary to cause foaming and is allowed to cure. After the foam product layer has been formed, the cover can be removed and any excess trimmed, if necessary. Any other suitable material or method of producing same can be used in place of the polyurethane foam material 74 shown in FIG. 9 of the drawings. The material can be a layer of honey-comb material 75 as depicted in FIG. 10, or any other suitable type of material, preferably a material which is relatively light in weight and non-porous.

Figure 7:
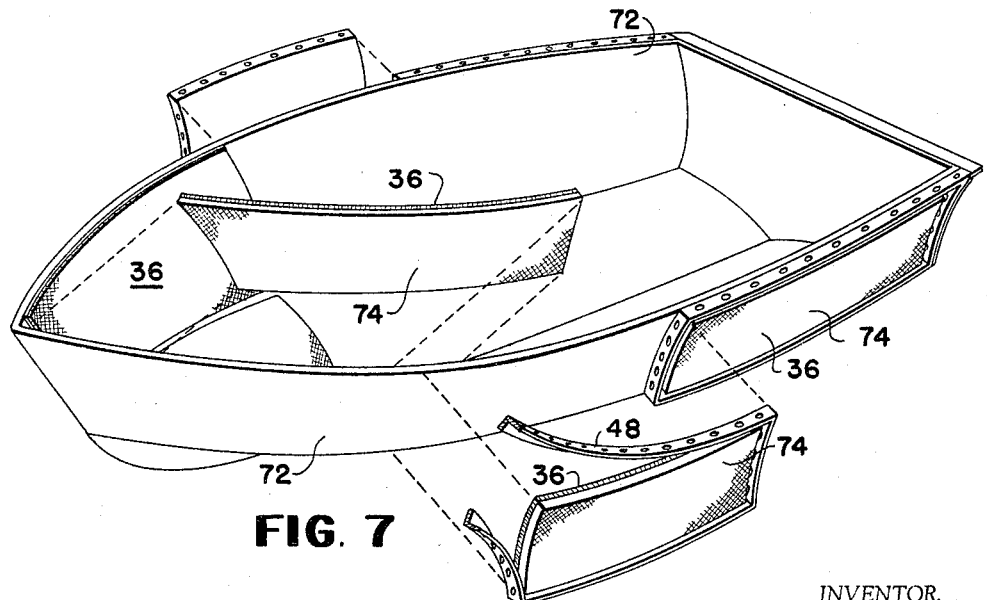
FIG. 7 is a perspective view illustrating method steps of a specific embodiment of my invention, wherein the sections of the female mold are removed and adhered to the outer shell of the molded article.
Figure 11:
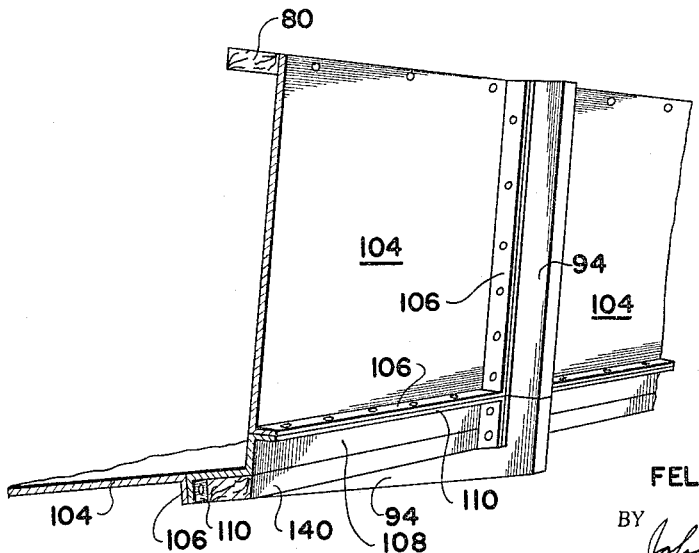
FIG. 11 is a partial cross sectional view showing a portion of a boat mold illustrating another embodiment of my invention.

As illustrated in FIG. 7, the disassembled sections or panels having a layer of foam adhered thereon are trimmed, that is, portions of the flange are removed where necessary and the section adhered on the inside surface of the molded hull 72 in interior positions generally underlying the corresponding original outside positions. As is evident in FIGS. 7 and 8, the flanged sections 36 are trimmed so that there are longitudinally and transversely extending spaces 76 and 78, respectively, between the adhered panels. A frame is then assembled and fitted within the resultant molded hull in the spaces 76 and 78 between the adhered panels. The construction of the frame will be discussed in detail later. A gunwale strip 80 can be conveniently secured to the molded hull of the boat. The gunwale strip 80 is bolted, screwed, or otherwise suitably secured to the female mold along the top edge thereof as shown in FIG. 11. When the resin layer forming the outer shell of the hull is molded within the female mold, it can be rolled under the gunwale 80 and adhered or otherwise secured to same. Subsequently, flanged sections 36 of the female mold 46 are removed from the outside of outer resin layer shell 72 and the gunwale 80, and trimmed, and adhered within the layer 72 closely abutting the gunwale strip. The re-located sections can also be adhered or otherwise secured, to the gunwale 80 for greater rigidity and strength.

The necessary elements for making the embodiment discussed hereinbefore can be produced and conveniently sold in a kit form. A kit adapted to utilize the preferred embodiment of the method of my invention is comprised of a plurality of connectible sections or panels 36 having flanges with apertures therethrough. The sections form a female mold having longitudinally 48 and transversely 50 extending mating pairs of flanges. The sections 36 can be provided with a layer or coating of foam material with cutouts around the apertures. Bolt means 42 are provided for joining the panel sections together. A hull mold support means 44 comprised of grooved support members 54 shaped to correspond to the transverse contour of the hull mold, and constructed and adapted to receive the secured transverse flanges 50 of the panel sections of the hull mold therein are provided. A central longitudinally extending grooved support member 52 having a shape corresponding to the longitudinal profile of the hull mold is also provided. The base for the support consists of a longitudinal member 58 to underlie the central support member 52 and transverse members 60 to underlie the transverse support members 54. Bearing members 62 connectible to the base members 58 and 60 and the support members 52 and 54 are included for maintaining the support members in spaced relation to the base. Woven glass fiber mat, disposable in the hull mold on the interior surface thereof, and a curable plastic resin for impregnating the glass fiber mats, are included in the kit for use in producing the preferred embodiment of the method of my invention.

Figure 8:
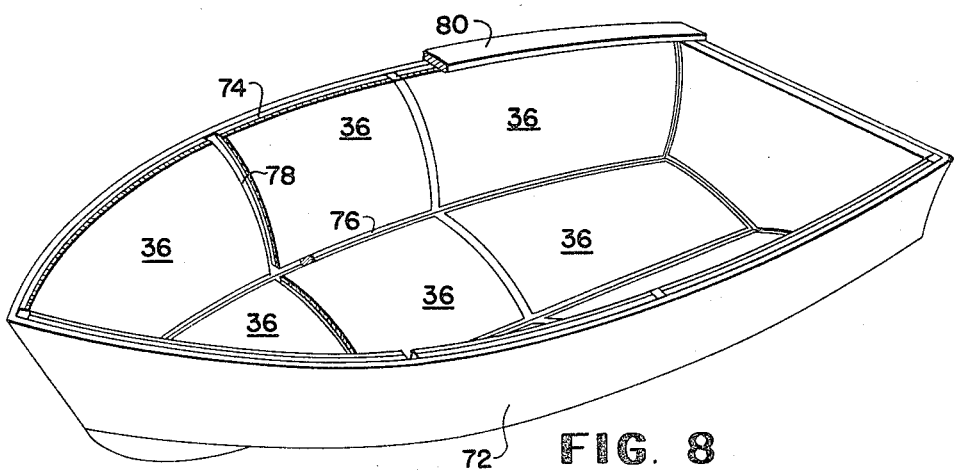
FIG. 8 is a perspective view showing a specific embodiment of my invention of a plastic sandwich construction of a molded boat hull and a gunwale strip in broken section.

The article of my invention, the preferred embodiment being a boat having a reinforced sandwich-type hull construction, made in accordance with the method described hereinbefore with the apparatus depicted in the drawings has a unitary outer shell 72 of fiberglass impregnated with cured polyester resin, and a sectioned inner shell of glass fiber impregnated with cured polyester resin, which sectioned inner shell consists of flanged panels or sections 36. The boat embodiment is illustrated in FIG. 8. A layer of closed cell foam material 74 is positioned between the outer shell 72 and the sections 36 of the inner shell, and adhered thereto. A reinforcing frame, not shown in FIG. 8, includes keel, chines, and transverse members positioned within the outer shell 72 between the sections 36 of the inner shell in spaces 76 and 78. The frame also includes a gunwale 80 secured to the top portion of the outer shell and to the reinforcing frame.

Another embodiment of my method of making a boat having a unitary hull construction of spaced reinforced plastic shell layers with a foamed plastic sandwich layer therebetween is depicted in FIGS. 11 through 21. In this preferred embodiment the flanged sections of the female mold, which are also subsequently adhered to the molded outer shell, can be initially molded to the proper size and shape thereby eliminating a flange trimming operation and thereby allow the entire flanged section to be utilized. Further, the outer shell layer formed within the female mold is supported by the frame during the operation of removing and adhering the flanged sections of the female mold to the inside of the shell.

The method consists of providing a male master mold 90 having an exterior shape the exact size and shape of the desired exterior size and shape of the desired boat hull to be molded. The male mold 90 is provided with removable longitudinally extending chine and keel blocks.

Figure 21:
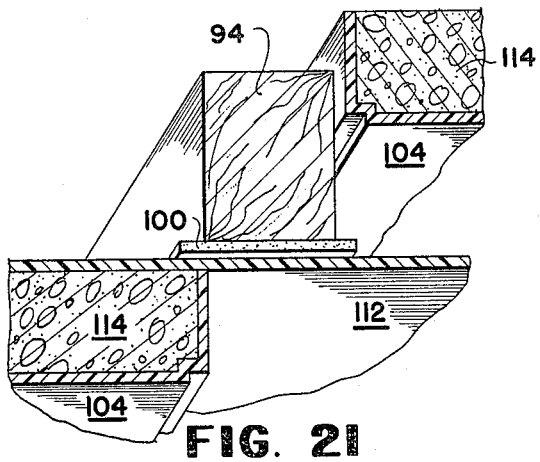
FIG. 21 illustrates succeeding steps in the method of molding of my invention.

The male mold 90 can have any suitable shape. The preferred embodiment has a shape similar to the male mold 30 depicted in FIG. 1. In the interest of saving space, only significant features of the male mold 90 are therefore depicted in the drawings. Longitudinally spaced, transversely extending support frames 94 are fitted to conform to the exterior shape of the male mold 90. The support frames must conform to any ridges etc. in the surface of the male mold 90. This fitting operation is most conveniently performed by providing the male mold 90 with a removable block 96 underlying the general position of the support frame 94. The removable block 96 can be removed from the male master mold 90, and upstanding plates (not illustrated) bolted to each side 98. A strip of resin impregnated glass fiber 100 is then laid in the channel formed between the members bolted on each side of member 96, and the support frame 94 pressed against it. After the strip of resin impregnated fiberglass 100 hardens, the side members are unbolted from the sides 98 of member 96 and the member inserted back into the mold 90. Thereupon, the chine block 92 and keel block (not shown) are removed from the male master mold 90. An L-shaped form member 102 is inserted in place of the chine block 92 and a U-shaped form member (not shown) for the keel block. The form members protrude beyond the surface of the male mold 90 as indicated in FIG. 14 of the drawing. With the support members 94 in position, a mold release lubricant is applied to the surfaces of the male mold, the support frames, and the form members 102 (FIG. 14). The form members can be formed in short lengths which fit between the transversely extending support members 94. A reinforced woven mat of glass fibers is laid on the male mold and against the sides of the support frames 94 and form members 102. An impregnating layer of a curable plastic resin is applied to the glass fiber mat to build up a layer having a thickness in the range of ⅛ to ¼ inch, or similar to the layer discussed previously in the previous embodiment. The layer can have any suitable thickness. The foregoing molding operation produces a plurality of flanged sections 104. The extending flanges 106 on sections 104 are spaced from the corner formed by the bottom and side of the mold 90. The flange formed by the form member replacing the keel block is spaced from the center line of the male mold. This spacing allows the sections to subsequently be adhered to the inside of the shell to be molded and allow a space therebetween. Thereafter, the form members are removed and the chine and keel blocks replaced. A mold release lubricant is applied to the surface of the chine and keel blocks. The position of the chine block in relation to the previously formed sections 104 is depicted in FIG. 15 of the drawings. A reinforcing layer of a woven mat of glass fibers is laid over the chine and keel blocks and against the flanges 106 of sections 104, which was previously formed. An impregnating layer of a curable plastic resin is applied to the glass fiber mat on the chine and keel blocks. A layer is built up having a thickness in the range of ⅛ to ¼ inch. The layer can however be of any suitable thickness. The resultant structure is another set of flanged panel sections 108 having flanges 110 abutting the flanges 106 of previously formed sections 104. This structure is shown in FIG. 16 of the drawings. Holes are then bored at spaced intervals in the resultant mating flanges 106 and 110. As in the former embodiment, the sections 104 and 108 are stripped from the male mold 90. Subsequently, the panels 104 and 108, and the support frames are reassembled to form a composite female mold. In this instance, the inside molding surface of the female mold is made up of the inside surfaces of panels 104, 108, and the resin impregnated glass fiber strip 100 supported on support frames 94. A suitable frame, generally similar to the support frame shown in FIG. 5, is constructed to support the support frames 94 in spaced relation to the floor. At this point, an inwardly extending gunwale strip 80 is attached along the top edge portion of the female mold as illustrated in FIG. 11. A mold release lubricant is applied to the inside of the female mold, and a reinforced woven mat of glass fiber is laid on the inside surface thereof, and under the gunwale 80. An impregnating layer of curable plastic resin is applied to the mat to build up a reinforced plastic layer or shell of a suitable thickness to form the outer shell layer 112 of the hull. The gunwale 80 is then additionally secured to the layer 112 by the use of wood screws, bolts, or the like. The first formed flanged sections 104 are then successively disassembled from the frames 94 and the last formed flanged sections 108 while supporting the hull shell 112 on the support frames 94 as depicted in FIG. 21 of the drawings. A layer of curable foamed plastic is formed on the outside surface of the disassembled sections 104 between the flanges thereof in the manner described in the previous embodiment. The foam sections 104 having a layer of foam 114 are then adhered to the inside surface of the molded hull shell 112 in interior positions generally underlying the corresponding original outside positions as illustrated in FIG. 21. A frame is fitted and assembled within the resultant molded hull between the adhered sections 104.

In addition to the method of forming the panels 104 and 108 set forth in this embodiment, there are several other ways of achieving the same construction. For example, the chine block 92 can be removed from the male master mold 90 and form member 116 attached thereto as illustrated in FIG. 13 of the drawings. Section 108 can then be formed thereon in the same general manner of forming the layer on the master mold discussed hereinbefore. The form members 116 are then removed from the chine block 92 and the chine block 92 and section 108 inserted in the male master mold. Flanged panels 104 are formed against flanges 110 of panel 108. In alternative, the flanged section 108 can be formed on chine block 92 as depicted in FIG. 13, and the flanged section 104 formed on the master mold as depicted in FIG. 14 of the drawings. The respective sections can then be assembled and the holes drilled therethrough with the rest of the process being the same. Another embodiment of the mold can have a support member positioned centrally of the male mold with the flanges atached to it, rather than a separate panel. This expedient would eliminate the need for a keel block.

In order to assure that the length of flanges 106 of flanged sections 104 are uniform throughout, a U-shaped channel member 118 can be placed over support member 94 and the reinforced woven glass fiber mat and layer of plastic molded against same. This expedient or other suitable means provides a method of accurately molding the edges of the flanged portions of the sections. This is particularly useful if a number of female molds are produced.

In the foregoing discussion only the construction of the flanges on panels 108 and 104 were illustrated in regard to the chine blocks of the male master mold. It is understood that the same general method steps could be used to form flanged sections or panels that extend over the keel block of a male master mold or any other sections where it would be desirable that separate sections be formed, or where a gap in the inner shell of sandwich-type construction is needed.

In order to expedite or increase the rate of production of the flanged sections of a female mold, it is often desirable that more than a single set of chine blocks 92 or keel blocks are provided with each male master mold. Sections can be made simultaneously on both the male master mold and the blocks, and the sections later combined. An additional duplicate set of chine blocks for the male master mold 90 can be simply and easily produced after a single set of flanged panels 104 and 108 have been produced. This operation is illustrated in FIG. 17 of the drawings. With flanged panels 104 in place on the master mold 90, a layer of resin impregnated glass fiber 130 is applied to the surfaces that the chine block 94 ordinarily engages. A similar layer 132 of resin impregnated glass fiber is applied to the inside surfaces of flanged panel 108. Before the resin impregnated layers 130 and 132 have hardened, section 108 is bolted to panels 104. The resultant chine block 94 is allowed to cure.

Figure 18:
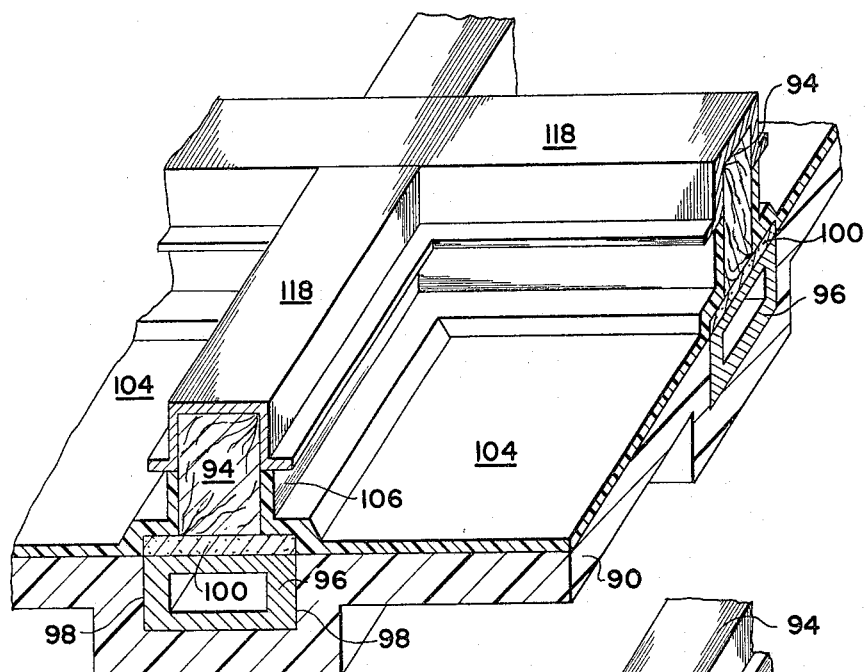
FIG. 18 is a detail view of a specific embodiment of my invention illustrating the relationship between the support members and flanged section of the female mold and the male master mold.
Figure 19:
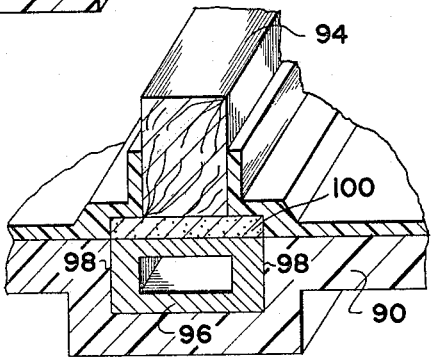
FIG. 19 is a detail view showing the relationship of a support member and flanged sections of the female mold.
Figure 20:
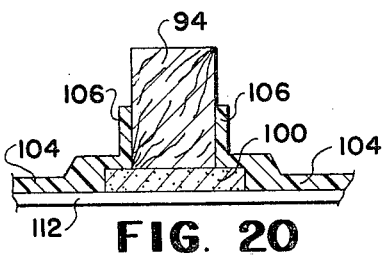
FIG. 20 illustrates a step of a specific embodiment of my novel method of molding.
Figure 22:
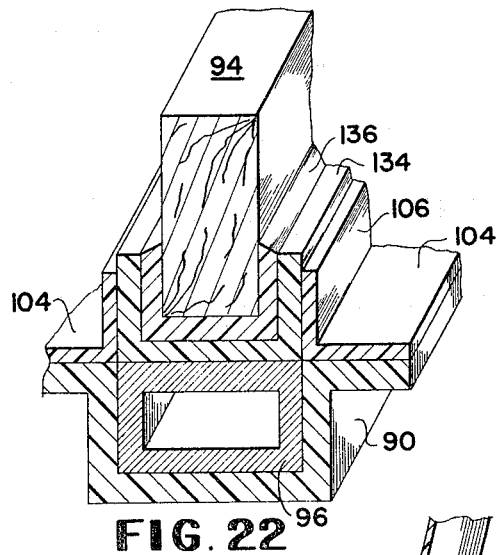
FIG. 22 illustrates still another construction of a female mold and supporting member.

Another embodiment for forming the flanges 106 of panel 104 is shown in FIG. 22 of the drawings. Underlying the transverse longitudinally spaced support members 94, or a longitudinally extending support member, is a U-shaped member 134 overlying block 96. During the formation of flanged panel 104, with support frame member 94 removed, a cap means is fitted over the upstanding legs of members 34 in the same general manner as depicted in FIG. 18. The cap member controls the height of flanges 106 as they are being formed. After the flanges 106 have been molded, the cap member is removed and a resin impregnated glass fiber strip 136 is inserted within member 134 and support member 94 wedged in. The resin impregnated glass fiber 136 is then allowed to harden.

The molding apparatus of my invention for producing a boat hull having spaced inner and outer shells and, in particular, for practicing the foregoing embodiment of my method, is illustrated in part in FIG. 11. It is a sectioned female hull mold having an inner surface configuration corresponding to the desired exterior shape of the hull to be molded. The female mold is comprised of a plurality of panel sections, each provided with outwardly extending flanges along the edge portions thereof. It has a central longitudinally extending support member having an inner shaped molding surface 100 with a profile configuration corresponding to the hull profile configuration, and a plurality of longitudinally spaced, traversely extending support members 94 joined to the bottom support member, and also provided with a molding surface 100, and conforming to the shape of the desired hull. The flanges on the panel sections are joined on each other, to the support member 94, and to the longitudinally extending support forming a composite sectioned female hull mold. The female hull mold is made up of sections 104 and 108 joined in the manner depicted in FIG. 11. If desired, the longitudinally extending support member can be substituted with a flanged section similar to section 108, to provide a space between sections 104. A base similar to the base depicted in FIG. 5 is provided for the frame. The base has a central longitudinal member 58 underlying the central longitudinally extending support member 52, and transverse, longitudinally spaced, members 54 underlying the transversely extending support members 94. A plurality of generally vertically extending elements 62 are attached to the longitudinal 58 and transverse 60 members of the base and to the respective overlying support members for supporting them in spaced relation, and for supporting the female mold sections in an upright position. A longitudinally extending support member 140 (FIG. 11) is affixed to the mating flanges 106 and 110 in order to lend rigidity to the apparatus. In this particular embodiment, the inner layer of the hull, after it has been molded within the female mold, is supported on the support members 94 and the longitudinally extending member (not shown in FIG. 11) while sections 104 are removed, a layer foam formed thereon, and adhered to the inside of the shell. This embodiment of my mold apparatus is therefore very advantageous in that the molded outer shell 112 of the hull is rigidly supported as the sections 104 are removed. The size of panels 104 can be varied by adjusting the size of the chine blocks and keel blocks so that no trimming is necessary and there remains a space of a suitable size between adjacent adhered sections. The spaces between the sections which are similar in placement to the placement in the embodiment shown in FIG. 8 provide convenient spaces for the construction of a reinforcing frame for the boat.

Figure 23:
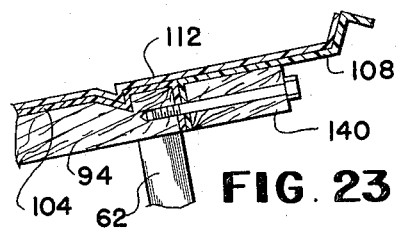
FIG. 23 shows a detail view of the frame construction of my support frame and a method step.
Figure 24:
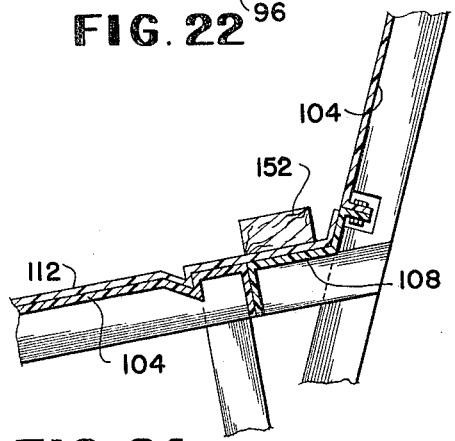
FIG. 24 illustrates a method step in the method of molding a sandwich-type boat of my invention.
Figure 25:
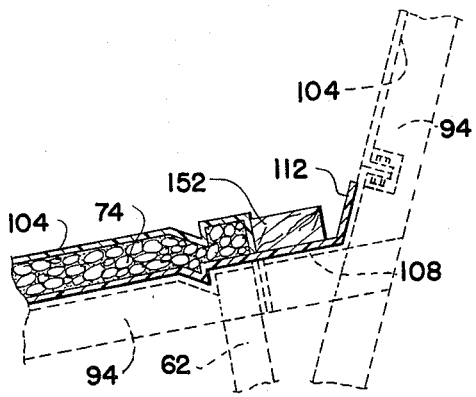
FIG. 25 illustrates another method step of my invention.
Figure 26:
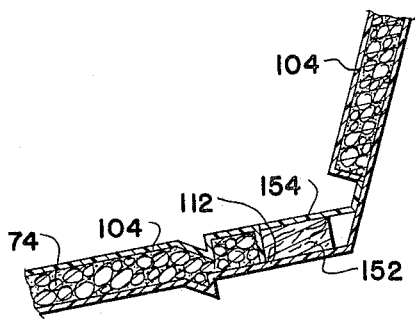
FIG. 26 illustrates my sandwich-type construction article supported on a support means.

In FIG. 23 to FIG. 26 is illustrated another embodiment of my method of producing a molded article, preferably a boat. In this embodiment, the female mold composed of sections 104 and 108 and supported on the frame means of my invention, is assembled to include only the bottom portion of the boat. The outer shell of the hull, namely layer 112, is molded in the manner described hereinbefore as illustrated in FIG. 23. The operation of forming the bottom portion of the shell layer 112 is much simplified if the upright side portions of the female mold are not in the way. Therefore, as indicated in FIG. 23, the bottom portion of shell layer 112 is formed before the upright sections of the female mold are bolted or secured to section 108. Subsequently, the remaining upright sections 104 of the female mold are bolted to the bottom section 108 of the female mold as indicated in 24. A longitudinally extending strip 152 can conveniently be positioned and fitted in the partially molded shell 112 along with the rest of the reinforcing frame in the bottom portion of the boat. A layer of reinforced molded material 112 is molded on the inner surface of flanged panel 104. The bottom panel 104 is then removed from the female mold (FIG. 25) formed with a layer of foam and adhered to the inside bottom surface of the molded shell 112. A layer of resin impregnated glass fiber can be applied over the strip 152 to thereby seal it within the layered structure of the boat. The upper portion of layer 112 is then applied on the interior surface of the upright panel 104 of the female mold. After it has dried, the exterior panel 104 of the female mold is foamed and adhered to the inside thereof.

While I have described and illustrated preferred embodiments of my invention, it is understood that the method, molding apparatus and article produced therefrom, as disclosed, may be made and produced in other forms than herein described or suggested without departing from the spirit of my invention.

I claim:
1. The method of molding a boat hull comprising mounting thin partitioning strips upon the outer surface of a master mold of the same shape as the boat hull to be molded in sufficient number to sub-divide the outer surface into relatively small surface area portions, coating the interior and sides of said partitioning strips on said master mold with a mold-releasing agent, molding therein a thin-walled molding corresponding in shape to the master mold bottom and partitioned sides of each sub-divided surface area, said moldings being formed of reenforcing glass fiber mat wet with a casting resin, stripping the set individual cast flanged sections after setting in said master molds, reassembling and fastening said cast flanged sections together to form a boat shape of the contiguous bottoms of the correspondingly reassembled castings, coating the contoured surface shaped to a boat hull formed by said reassembled castings with a mold-releasing agent, casting a continuous reenforcing mat of glass fiber impregnated with casting resin upon said reassembled mold surfaces, and then removing the precast molded shapes from said cast boat hull.

2. The method of molding a boat hull comprising mounting thin partitioning strips upon the outer surface of a master mold of the same shape as the boat hull to be molded in sufficient number to sub-divide the outer surface into relatively small surface area portions, coating the interior and sides of said partitioning strips on said master mold with a mold releasing agent, molding therein a thin-walled molding corresponding in shape to the master mold bottom and partitioned sides of each sub-divided surface area, said moldings being formed of reenforcing glass fiber mat wet with a casting resin, stripping the set individual cast flanged sections after setting in said master molds, reassembling and fastening said cast flanged sections together to form a boat shape of the contiguous bottoms of the correspondingly reassembled castings, coating the contoured surface shaped to a boat hull formed by said reassembled castings with a mold-releasing agent, casting a continuous reenforcing mat of glass fiber impregnated with casting resin upon said reassembled mold surfaces, removing said precast mold shapes from said cast boat hull, filling the flanged inner surfaces of said precast separated mold sections with a curable foamable plastic, setting said plastic foam, and adhesively securing the cast filled sections to the inner side of the hull precast therefrom.

3. The method of claim 2 wherein the thin partitioning strips are mounted longitudinally and transverse of said master mold, the precast sections filled with foamable plastic first have many of their flanges removed to leave longitudinal and transverse spaces formerly occupied by their flanges, and after adhesively securing the foamed laminar castings to the inside of said cast hull, the spaces thus formed are finally filled with reenforcing framing members.

4. The method of forming a boat hull comprising assembling a series of precast flanged shapes having bottoms faired to conform to a surface area of a boat, each interfitting with their flanges assembled side by side in a series and secured flange to flange, whereby the contiguous bottoms form the contoured shape of a boat hull in assembled form, coating the bottoms of the assembly with a mold-release agent, casting a continuous reenforcing glass fiber mat impregnated with casting resin on said continuous hull bottom surface of said assembly and curing said resin as a cast boat hull, separating the flanged mold sections from said hull, casting a foamed plastic layer on the inside of each flanged section and adhesively securing said foamed bodies on the inside of said cast boat hull to form a foamed cast layer therein.

5. The method of claim 4 wherein the foam filled flanged molds first have many of their flanges removed before adhesively securing said molds to the inside of said boat hull, thereby forming longitudinal and transverse spaces therebetween and finally fitting framing members to the resultant molded hull in said spaces.

(References on following page)

References Cited by the Examiner

UNITED STATES PATENTS

| | | | |
|---|---|---|---|
| 1,277,845 | 9/1918 | Buel | 25—130 |
| 1,322,034 | 11/1919 | McLeod | 25—130 |
| 1,463,841 | 8/1923 | Richman | 264—219 |
| 2,417,586 | 3/1947 | Crosley | 156—212 |
| 2,420,488 | 5/1947 | Marhoefer et al. | 156—182 |
| 2,809,415 | 10/1957 | Couelle | 264—219 |
| 2,811,408 | 10/1957 | Braley | 264—338 |
| 2,815,309 | 12/1957 | Ganahl et al. | 156—212 |
| 2,868,684 | 1/1959 | Labino | 161—141 |
| 2,905,579 | 9/1959 | Sumner | 156—182 |
| 2,956,292 | 10/1960 | Newsome | 9—6 |
| 3,070,817 | 1/1963 | Kohrn | 9—6 |
| 3,083,665 | 4/1963 | Steidley | 114—0.5 |

EARL M. BERGERT, *Primary Examiner.*

FERGUS S. MIDDLETON, *Examiner.*

D. P. NOON, H. F. EPSTEIN, *Assistant Examiners.*